United States Patent [19]

Homma

[11] Patent Number: 4,588,136
[45] Date of Patent: May 13, 1986

[54] FOOD SHAVING APPARATUS
[75] Inventor: Shinobu Homma, Tokyo, Japan
[73] Assignee: Kabushiki Kaisha Honma, Tokyo, Japan
[21] Appl. No.: 673,626
[22] Filed: Nov. 21, 1984
[30] Foreign Application Priority Data
 Sep. 5, 1984 [JP] Japan .................. 59-133872[U]
[51] Int. Cl.$^4$ .............................................. B02C 18/00
[52] U.S. Cl. ...................... 241/95; 241/168; 241/DIG. 17
[58] Field of Search ............. 241/100, 95, 169, 169.1, 241/169.2, 168, DIG. 17, 92
[56] References Cited
U.S. PATENT DOCUMENTS
1,157,013 10/1915 Lewis ............................. 241/92
1,341,894  6/1920 Freeman ........................ 241/92
2,590,909  4/1952 Westby et al. ............... 241/92 X
3,559,896  2/1971 Sugiyama .................... 241/95
3,679,140  7/1972 Kaishita et al. ............. 241/95

Primary Examiner—Mark Rosenbaum
Attorney, Agent, or Firm—Sprung Horn Kramer & Woods

[57] ABSTRACT

A shaving apparatus for shaving food such as ice cubes made by a domestic-use refrigerator including a reservoir or container, a cutter blade, a rotating cylinder, and a mechanism for rotating the cylinder. The rotating cylinder can hold a large number of ice cubes and has at least one projecting portion engaging with the ice cubes. The rotating cylinder is rotatably supported about the axis thereof and is rotated by the mechanism. The ice cubes are rotated by the projecting portion of the cylinder and shaved by the cutter blade into fine slivers of ice.

6 Claims, 6 Drawing Figures

FOOD SHAVING APPARATUS

BACKGROUND OF THE INVENTION

1. Field of the Invention

The present invention relates to an apparatus for shaving food, in particular, it relates to an apparatus suitable for shaving ice.

2. Description of the Prior Art

An apparatus for shaving relatively small cubes of ice, for example, ice cubes formed in a tray in a domestic-use refrigerator, is known. This conventional apparatus is constituted in such a manner that a cylinder member holding an ice cube rotates about an axis eccentric to the axis of the cylinder member and the cylinder member is inclined in such a manner that the ice cube is urged or pressed toward an opening formed at a lower portion of the cylinder member. Thus the ice cube held in the cylinder member is pressed against a cutter blade facing the opening, and is shaved.

The operation of the above shaving apparatus, however, is not very effective; in that the cylinder member can hold only a few cubes of ice, and the apparatus cannot produce sufficiently thin slivers of ice because the cylinder member cannot press the ice against the cutter with the necessary force.

SUMMARY OF THE INVENTION

An object of the present invention is to provide an ice shaving apparatus showing a high working efficiency, i.e., which can contain a larger number of cubes of ice at one time.

Another object of the present invention is to provide an ice shaving apparatus which can shave ice into fine slivers.

According to the present invention, there is provided an ice shaving apparatus comprising a reservoir, a cutter blade, a rotating cylinder, and a rotating means. The cutter blade is disposed above the reservoir, and the reservoir is provided for holding shavings from an object such as an ice cube. The rotating cylinder is rotatably supported about the axis of the cylinder and is rotated by the rotating means. The cylinder holds the objects to be shaved and has at least one projecting portion engaging with those objects. The objects are rotated about the axis of the cylinder by the rotating means, are shaved by cutter blade, and the resulting shavings drop down into and are held by the reservoir.

BRIEF DESCRIPTION OF THE DRAWINGS

The present invention may be more fully understood from the description of preferred embodiments of the invention set forth below, together with the accompanying drawings, in which.

DESCRIPTION OF THE PREFERRED EMBODIMENTS

FIGS. 1 through 6 show an embodiment of the present invention.

Figure 1:
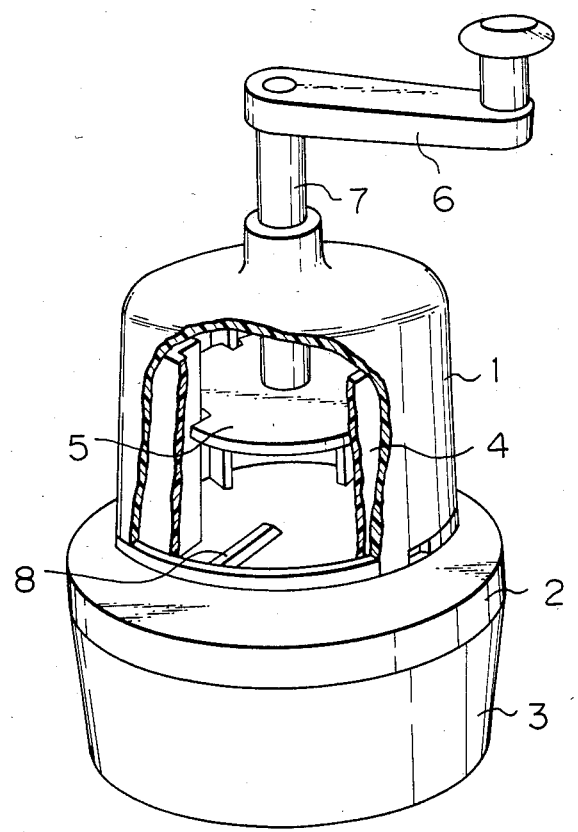
FIG. 1 is a perspective view of an embodiment of the present invention with a part cut away.

Referring to FIG. 1, an inverted cup-shaped casing 1 is placed on a cover 2 fitted to an opening portion of a cup-shaped reservoir or container 3, and a rotating cylinder 4 is housed in the casing 1. The rotating cylinder 4 is constructed in such a manner that it is rotated by a pressure plate 5, housed in the cylinder 4. The pressure plate 5 is rotated by a handle 6 disposed outside of the casing 1, and connected to an end portion of a rod 7 extending from the center of the pressure plate 5. A cutter blade 8 is attached to the cover 2. The ice cubes are held between the pressure plate 5 and the cover 2 in the rotating cylinder 4, are rotated by the pressure plate 5 and the rotating cylinder 4 to be shaved by the cutter blade 8, and the resulting shavings drop down into and are held by the container 3.

Figure 2:
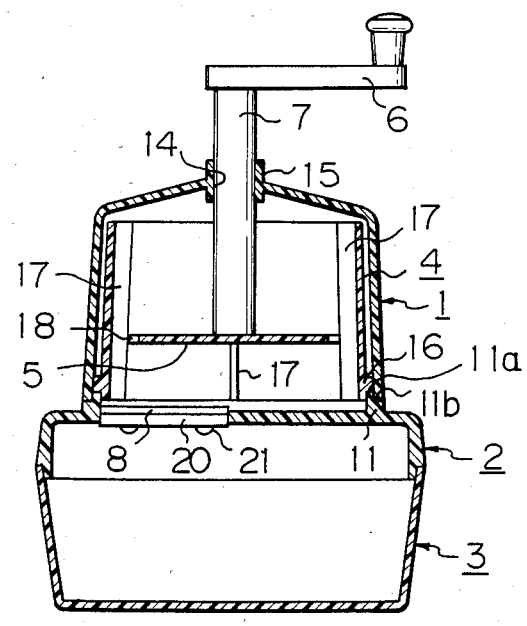
FIG. 2 is a sectional view of the embodiment.
Figure 3:
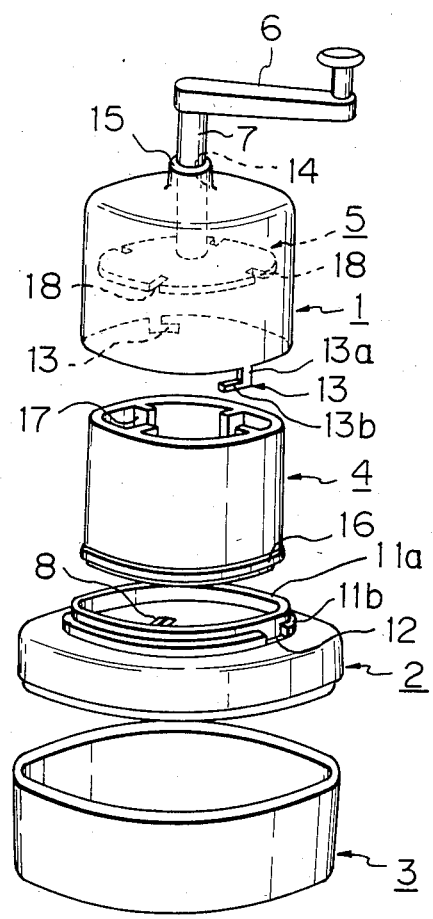
FIG. 3 is a perspective view of the embodiment in a disassembled state.
Figure 4:
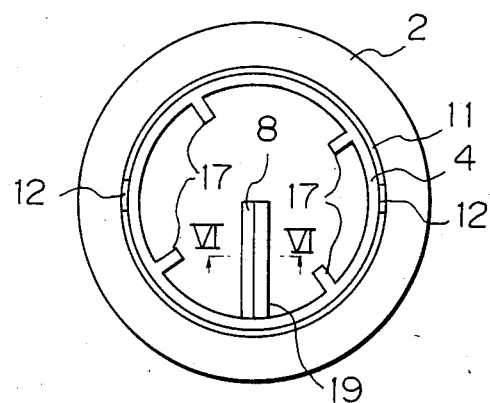
FIG. 4 is a plan view of a cover with a rotating cylinder, according to the present invention.

FIG. 2 shows a sectional view of the embodiment. The container 3 holding the shaved ice is made of transparent plastic, so that the quantity of shaved ice held in the container 3 can be seen from outside of the container 3. The cover 2 is formed with an annular support portion 11 on the upper surface thereof, the annular support portion 11 supporting the casing 1 and the rotating cylinder 4. The upper surface of the annular support portion 11 is formed in a step-shape in such a manner that the annular support portion 11 is composed of a relatively high inner annular portion 11a and a relatively low outer annular portion 11b. As shown in FIG. 3 and FIG. 4, the outer annular portion 11b has gaps formed at two positions diametrically opposed on the periphery of the annular support portion 11, and the gaps have holes 12 passing through the annular support portion 11 and the cover 2, respectively. The casing 1 is supported on the outer annular portion 11b, and the rotating cylinder 4 is rotatably and slidably supported on the inner annular portion 11a.

As shown in FIG. 3, two hooks 13 are attached to the lower peripheral portion of the casing 1. Each hook 13 is composed of a connecting portion 13a extending downward from the lower peripheral portion of the casing 1 and an engaging portion 13b extending horizontally from the connecting portion 13a. Thus, when the hooks 13 are inserted into the holes 12, the casing 1 is fixed to the cover 2. That is, the casing 1 is fixed to the cover 2 by inserting the hooks 13 into the holes 12 and rotating the casing 1 in the direction in which the engaging portion 13b extends, so that the engaging portion 13b engages with an under surface of the cover 2. A hole 14 is formed in the center of a top portion of the casing 1, through which the rod 7 passes, the hole 14 being defined by a guide tube 15 which extends along the axis of the casing and slidably supports the rod 7.

The diameter of the rotating cylinder 4 is smaller than that of the casing 1, the rotating cylinder 4 having, on a lower portion thereof, an annular projection 16 which engages with and is supported by the inner annular portion 11a of the annular support portion 11. The rotating cylinder 4 also has four engaging portions or ribs 17 on the inner surface thereof, the ribs 17 extending along the axis of the rotating cylinder 4. These ribs 17 are substantially rectangular plates projecting toward the axis of the rotating cylinder 4, and are located at constant intervals; that is, the ribs 17 are disposed 90° apart about the axis of the rotating cylinder 4. The pressure plate 5 engages with the ribs 17 as described below. The lower end portion of the rotating cylinder 4 is located on an upper portion of the upper surface of the cover 2 in such a manner that the rotating cylinder 4 will not come in contact with the cutter blade 8.

Figure 5:
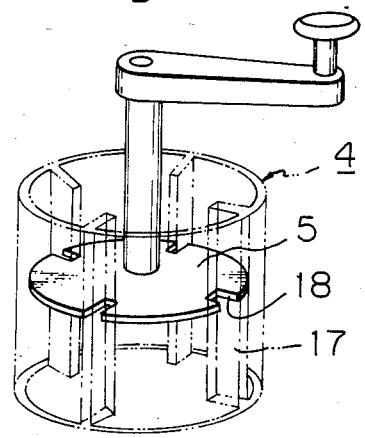
FIG. 5 is a perspective view of a rotating means according to the present invention.

The pressure plate 5 is in the shape of a disk, as shown in FIGS. 3 and 5, and has four notches 18 extending in the radial direction on the peripheral portion of the disk. These notches 18 are formed at constant intervals and engage with the ribs 17, respectively. The pressure plate 5 is guided by the ribs 17 to move up and down relative to the axis of the rotating cylinder 4, and rotates the rotating cylinder 4 about its axis through contact with the ribs 17. The pressure plate 5 is rotated by the handle 6 through the rod 7. Thus, the mechanism for rotating the rotating cylinder 4 is constructed from the pressure plate 5, the rod 7, and the handle 6.

Figure 6:
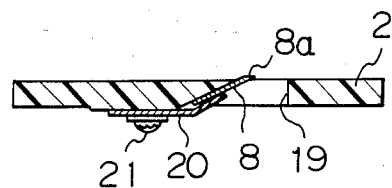
FIG. 6 is a sectional view along line VI—VI of FIG. 4.

The cutter blade 8 is provided in a slot 19 formed in the cover 2, and is disposed substantially along the radial direction of the cover 2. FIG. 6 shows a construction wherein the cutter blade 8 is attached to the cover 2. As shown in the drawing, the cutter blade 8 is fixed by a retainer plate 20 attached to a rear surface of the cover 2 by a screw 21 in such a manner that an edge 8a of the cutter blade 8 projects from the upper surface of the cover 2.

In this embodiment, the apparatus is basically made of plastic, except for the cutter blade 8, the retainer plate 20, and the screw 21, and can be disassembled as shown in FIG. 3.

To assemble the apparatus for use, first the cover 2 is fitted to the container 3, and the annular projection 16 of the rotating cylinder 4 is then placed on the inner annular portion 11a of the annular support portion 11, attaching the rotating cylinder 4 to the cover 2. An appropriate number of ice cubes are placed in the rotating cylinder 4, and the casing 1 together with the pressure plate 5 is then attached to the cover 2. In this state, the notches 18 of the pressure plate 5 are engaged with the ribs 17, respectively. The handle 6 is then rotated with a downward pressure, the ice cubes are pressed downward by the pressure plate 5 and rotated by the ribs 17 to come into contact with the cutter blade 8. Thus, the ice cubes are shaved and fine slivers of ice drop down into and are held by the container 3.

The cover 2 is then removed from the container 3, and the ice slivers are taking out. Ice remaining in the rotating cylinder 4 is removed after the casing 1 and the rotating cylinder 4 are detached from the container 3.

As mentioned above, according to this embodiment, a larger number of ice cubes made by a domestic-use refrigerator are shaved at one time, and very fine slivers of ice are produced.

The present invention can be also applied to an apparatus for shaving food such as vegetables.

Although the embodiments of the present invention have been described herein with reference to the attached drawings, many modification and changes may be made by those skilled in this art without departing from the scope of the invention.

I claim:

1. An apparatus for shaving an object such as an ice cube comprising:
   a reservoir for containing shavings from said object,
   a cutter blade disposed above said reservoir,
   a rotating cylinder having a central axis and supported for rotation about the axis, said rotating cylinder holding the object to be shaved, and having at least one projecting portion engaging with said object, the object being rotated to be shaved by said cutter blade,
   an inverted cup-shaped casing covering said rotating cylinder, and
   means supported by the casing for rotating said rotating cylinder about the axis thereof, comprising a rod extending through a hole formed in said casing, a pressure plate housed in said rotating cylinder and connected to one end portion of said rod, means mounting the pressure plate in the rotating cylinder such that the pressure plate rotates with the cylinder and moves relative thereto along said central axis, said pressure plate being formed with a notch engaging with said at least one projecting portion, a handle disposed outside of said casing and connected to the other end portion of said rod to rotate the pressure plate with said rotating cylinder as one body about the central axis thereof while simultaneously pressing the pressure plate downwardly towards the cutter blade.

2. An apparatus according to claim 1, wherein said projecting portion of said rotating cylinder is a rib provided on the inner surface of said rotating cylinder, said rib extending along the axis of said rotating cylinder.

3. An apparatus according to claim 2, wherein the number of said ribs is four, said ribs being located 90° apart about the axis of said rotating cylinder.

4. An apparatus according to claim 1, wherein said hole is defined by a guide tube formed on a top portion of said casing.

5. An apparatus according to claim 1, further comprising a cover fitting the opening portion of said reservoir, said cover being formed with a slot, said cutter blade being disposed along a radial direction of said cover in said slot, the shavings from the object to be shaved passing through said slot to drop down into said reservoir.

6. An apparatus according to claim 5, wherein said cover is formed with an annular projection on the upper surface thereof, said annular projection supporting said rotating cylindner.

* * * * *